United States Patent
Armstrong et al.

(10) Patent No.: US 8,209,698 B2
(45) Date of Patent: *Jun. 26, 2012

(54) PROCESSOR CORE WITH PER-THREAD RESOURCE USAGE ACCOUNTING LOGIC

(75) Inventors: William Joseph Armstrong, Rochester, MN (US); Michael Stephen Floyd, Austin, TX (US); Ronald Nick Kalla, Round Rock, TX (US); Larry Scott Leitner, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

This patent is subject to a terminal disclaimer.

(21) Appl. No.: 12/579,540

(22) Filed: Oct. 15, 2009

(65) Prior Publication Data

US 2010/0037233 A1     Feb. 11, 2010

Related U.S. Application Data

(63) Continuation of application No. 10/422,025, filed on Apr. 23, 2003, now Pat. No. 7,657,893.

(51) Int. Cl.
*G06F 9/46* (2006.01)
*G06F 7/38* (2006.01)

(52) U.S. Cl. ........................ 718/104; 712/229

(58) Field of Classification Search .................. None
See application file for complete search history.

(56) References Cited

U.S. PATENT DOCUMENTS

| 5,210,872 A | 5/1993 | Ferguson et al. |
| 5,530,860 A | 6/1996 | Matsuura |
| 5,761,091 A | 6/1998 | Agrawal et al. |

(Continued)

FOREIGN PATENT DOCUMENTS

JP     56153457     11/1981

(Continued)

OTHER PUBLICATIONS

Jim Maure, "Research on the Solaris Kernel the 30th: utilization ration and microstate accounting", SunWorld, IDG Japan, Inc., Nov. 1, 2000, vol. 10, No. 11, pp. 108-109, Japan.

(Continued)

*Primary Examiner* — S. Sough
*Assistant Examiner* — Phuong Hoang
(74) *Attorney, Agent, or Firm* — Mitch Harris, Atty at Law, LLC; Andrew M. Harris; Matthew W. Baca

(57) ABSTRACT

Processor time accounting is enhanced by per-thread internal resource usage counter circuits that account for usage of processor core resources to the threads that use them. Relative resource use can be determined by detecting events such as instruction dispatches for multiple threads active within the processor, which may include idle threads that are still occupying processor resources. The values of the resource usage counters are used periodically to determine relative usage of the processor core by the multiple threads. If all of the events are for a single thread during a given period, the processor time is allocated to the single thread. If no events occur in the given period, then the processor time can be equally allocated among threads. If multiple threads are generating events, a fractional resource usage can be determined for each thread and the counters may be updated in accordance with their fractional usage.

13 Claims, 4 Drawing Sheets

U.S. PATENT DOCUMENTS

| | | | |
|---|---|---|---|
| 5,809,268 A | 9/1998 | Chan | |
| 5,812,844 A * | 9/1998 | Jones et al. | 718/104 |
| 5,822,602 A | 10/1998 | Thusoo | |
| 5,835,705 A | 11/1998 | Larsen et al. | |
| 5,838,976 A | 11/1998 | Summers | |
| 6,092,175 A | 7/2000 | Levy et al. | |
| 6,175,814 B1 | 1/2001 | Chrysos et al. | |
| 6,381,676 B2 | 4/2002 | Aglietti et al. | |
| 6,535,905 B1 | 3/2003 | Kalafatis et al. | |
| 6,957,432 B2 | 10/2005 | Ballantyne | |
| 2001/0054057 A1 | 12/2001 | Long et al. | |
| 2001/0056456 A1 | 12/2001 | Cota-Robles | |
| 2002/0161817 A1 * | 10/2002 | Dorofeev et al. | 709/104 |
| 2002/0163520 A1 | 11/2002 | Hardin et al. | |
| 2002/0194251 A1 | 12/2002 | Richter et al. | |
| 2003/0004683 A1 | 1/2003 | Nemawarkar | |
| 2003/0033509 A1 | 2/2003 | Leibholz et al. | |
| 2004/0054876 A1 | 3/2004 | Grisenthwaite et al. | |

FOREIGN PATENT DOCUMENTS

| | | |
|---|---|---|
| JP | 04021114 | 1/1992 |
| JP | 2002244888 | 8/2002 |

OTHER PUBLICATIONS

Final Office Action in U.S. Appl. No. 10/422,025, Aug. 3, 2009.

* cited by examiner

PROCESSOR CORE WITH PER-THREAD RESOURCE USAGE ACCOUNTING LOGIC

The present U.S. patent application is a Continuation of U.S. patent application Ser. No. 10/422,025, filed on Apr. 23, 2003 and issued as U.S. Pat. No. 7,657,893 on Feb. 2, 2010.

BACKGROUND OF THE INVENTION

1. Field of the Invention

The present invention relates generally to processors and computing systems, and more particularly, to a simultaneous multi-threaded (SMT) processor. The present invention also relates to processor usage accounting systems.

2. Description of Related Art

Present-day high-speed processors include the capability of simultaneous execution of instructions, speculative execution and loading of instructions and simultaneous operation of various resources within a processor. In particular, it has been found desirable to manage execution of one or more threads within a processor, so that more than one execution thread may use the processor and so that resources more effectively than they are typically used by a single thread.

Prior processor designs have dealt with the problem of managing multiple threads via a hardware state switch from execution of one thread to execution of another thread. Such processors are known as hardware multi-threaded (HMT) processors, and as such, can provide a hardware switch between execution of one or the other thread. An HMT processor overcomes the limitations of waiting on a stalled thread by permitting the hardware to switch execution to a another thread. Execution of both threads can be performed not simultaneously, but by allocating execution slices to each thread when the other thread experiences a stall condition such as a cache miss.

Simultaneous multi-threaded (SMT) processors provide an even more efficient use of processor resources, as multiple threads may simultaneously use processor resources. Multiple threads are concurrently executed in an SMT processor so that multiple processor execution units, such as floating point units, fixed point instruction units, load/store units and others can be performing tasks for one (or more depending on the execution units' capabilities) of multiple threads simultaneously. Storage and register resources may also be allocated on a per-thread basis so that the complete internal state switch of the HMT is avoided.

Accounting for processor time use is necessary for administration of computer services sales, as well as for internal cost-accounting management when, for example, some processor runs are for research and development activities that permit the hardware to be capitalized in a different manner for tax purposes than other uses. A server may be partitioned and processor time told to multiple users "on demand" or on an as-used basis. Additionally, processor time may be utilized by hardware owners or lessors and also subcontracted out to entities paying for services. Therefore, accurate accounting for processor execution time is a necessity in computer architectural and software models. Also, processor time usage, especially on a per-thread basis, is useful for profiling programs for optimization.

In single-threaded processing systems, accounting is generally straightforward. A count of processor cycle use or even simple "wall-clock" time measurement can be provided for complete job runs, as even if multiple threads within multiple programs are executed, they are not executed simultaneously, but sequentially. A tally of cycle times is maintained until a job is complete and the total is presented for accounting purposes. The measured time correlates directly to processor resource utilization.

In an HMT machine, the task is similar in that within the processor hardware, only one thread is executing at a time and multiple counters are used to track the processor time usage of each thread while, by running a counter only while its associated thread is active. However, in an SMT processor, two or more threads may be simultaneously executing within a single processor core and the usage of resources by each thread is not easily determined by a simple execution count or time measurement.

It is therefore desirable to provide a method and apparatus that can account for processor time usage in an SMT processor. It is further desirable to provide a method for accounting for resource usage within an SMT processor usage among threads executing within such a processor.

BRIEF SUMMARY OF THE INVENTION

The objective of accounting for processor time usage within a simultaneous multi-threaded (SMT) processor is accomplished in a processor having processor utilization counters and a method for accounting for processor time usage.

The processor incorporates multiple processor usage cycle counters, one associated with each thread executing within a processor to provide a count corresponding to processor resource usage by each thread. Relative resource usage is detected on a per-thread basis and is used to update the cycle counters. The resource usage detection may be carried out by detecting the presence of a particular cycle state indicating active instruction processing for a thread. The cycle state is detected by sampling periodically, which may be at each clock cycle, and the counters are incremented (or alternatively decremented) in conformity with the detected cycle state. The detected state is chosen to be indicative of relative processor resource usage by each thread.

The detected cycle state may be a dispatch of an instruction for a thread. Cycles for which neither thread is in the particular cycle state may be charged evenly to each thread, or the cycle may be charged in conformity with a last dispatch state for all threads. Alternatively, non-indicating cycles may be charged in conformity with an ordered thread priority, which gives an indication of relative thread resource usage. Cycles in which one thread is in the particular cycle state and the other thread is not may be charged fully to the thread in the particular cycle state, thus providing for charging active threads over idle threads. Also, cycles may be charged in conformity with fractional values indicating the number of resources used in a given cycle by each thread.

The processor may be capable of both SMT and single-threaded (ST) operating modes, and the accounting may be selectively responsive to a selected mode, charging all cycles to a single thread executing in ST mode.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DETAILED DESCRIPTION OF THE INVENTION

Figure 1:
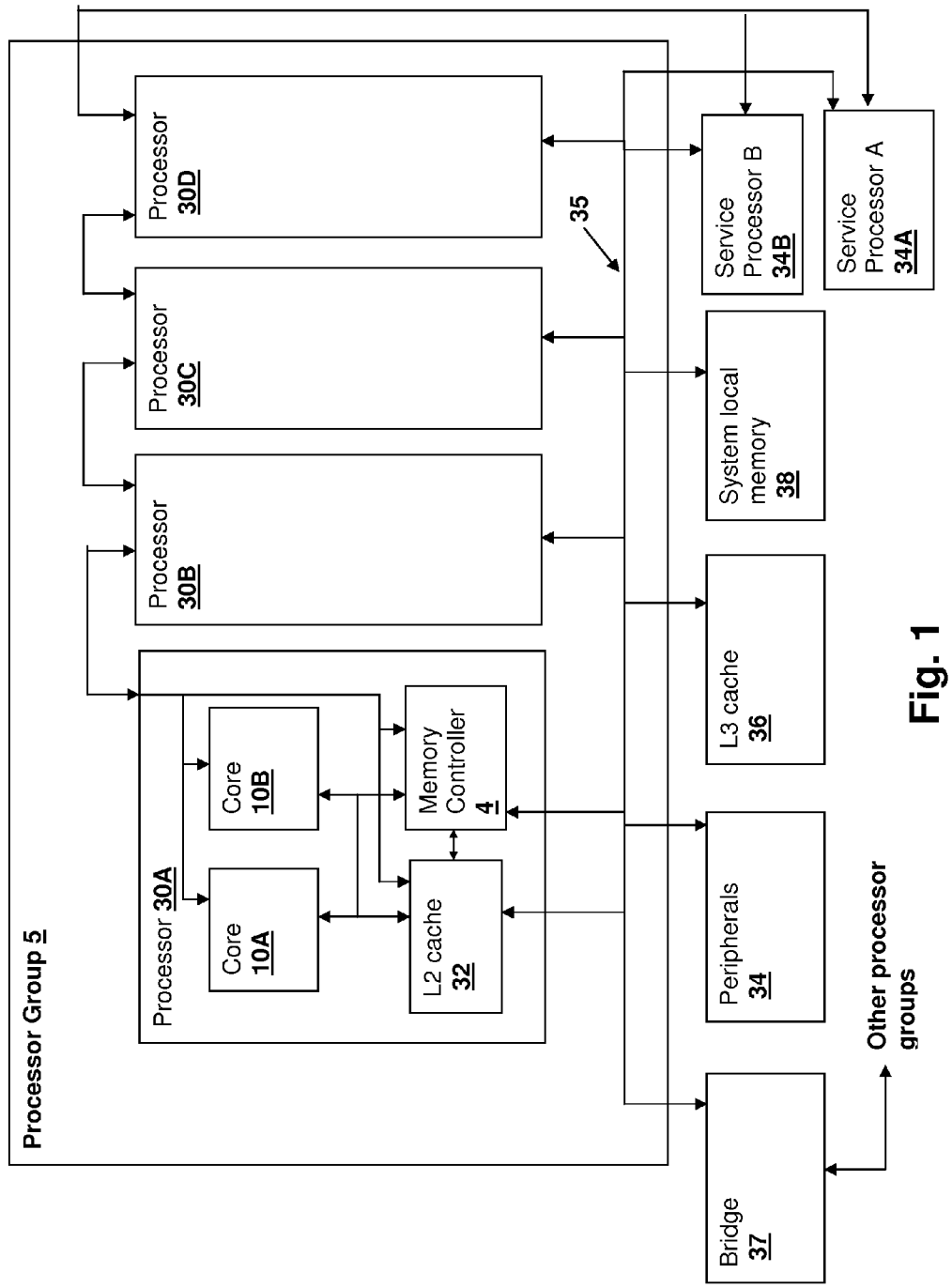
FIG. 1 is a block diagram of a system in accordance with an embodiment of the invention.

With reference now to the figures, and in particular with reference to FIG. 1, there is depicted a block diagram of a system in accordance with an embodiment of the present invention. The system includes a processor group 5 that may be connected to other processor groups via a bridge 37 forming a super-scalar processor. Processor group 5 is connected to an L3 cache unit 36 system local memory 38 and various peripherals 34, as well as to two service processors 34A and 34B. Service processors provide fault supervision, startup assistance and test capability to processor group 5 and may have their own interconnect paths to other processor groups as well as connecting all of processors 30A-D. Within processor group 5 are a plurality of processors 30A-D, generally fabricated in a single unit and including a plurality of processor cores 10A and 10B coupled to an L2 cache 32 and a memory controller 4. Cores 10A and 10B provide instruction execution and operation on data values for general-purpose processing functions. Bridge 37, as well as other bridges within the system provide communication over wide buses with other processor groups and bus 35 provide connection of processors 30A-D, bridge 37, peripherals 34, L3 cache 36 and system local memory 38. Other global system memory may be coupled external to bridge 37 for symmetrical access by all processor groups.

Processor cores 10A and 10B are simultaneous multi-threaded (SMT) processors capable of concurrent execution of multiple threads. Processor cores 10A and 10B further support a single-threaded operating mode for efficient execution of a single thread when program execution conditions dictate single threaded operation, e.g., when high-priority program execution must be completed by a known time, or when one thread in a multi-threaded processor is known to be idle. Multi-threading introduces some inefficiencies over full-time execution of a single-thread, but overall there is a system efficiency advantage as threads are often idle waiting on other tasks to complete. Therefore transitioning between single-threaded and multi-threaded mode provides an advantage in adapting to one or more of the above-described conditions, and embodiments of the present invention provide accounting for processor time in a manner consistent with a processor that provides processor time accounting responsive to such transitions.

Figure 2:
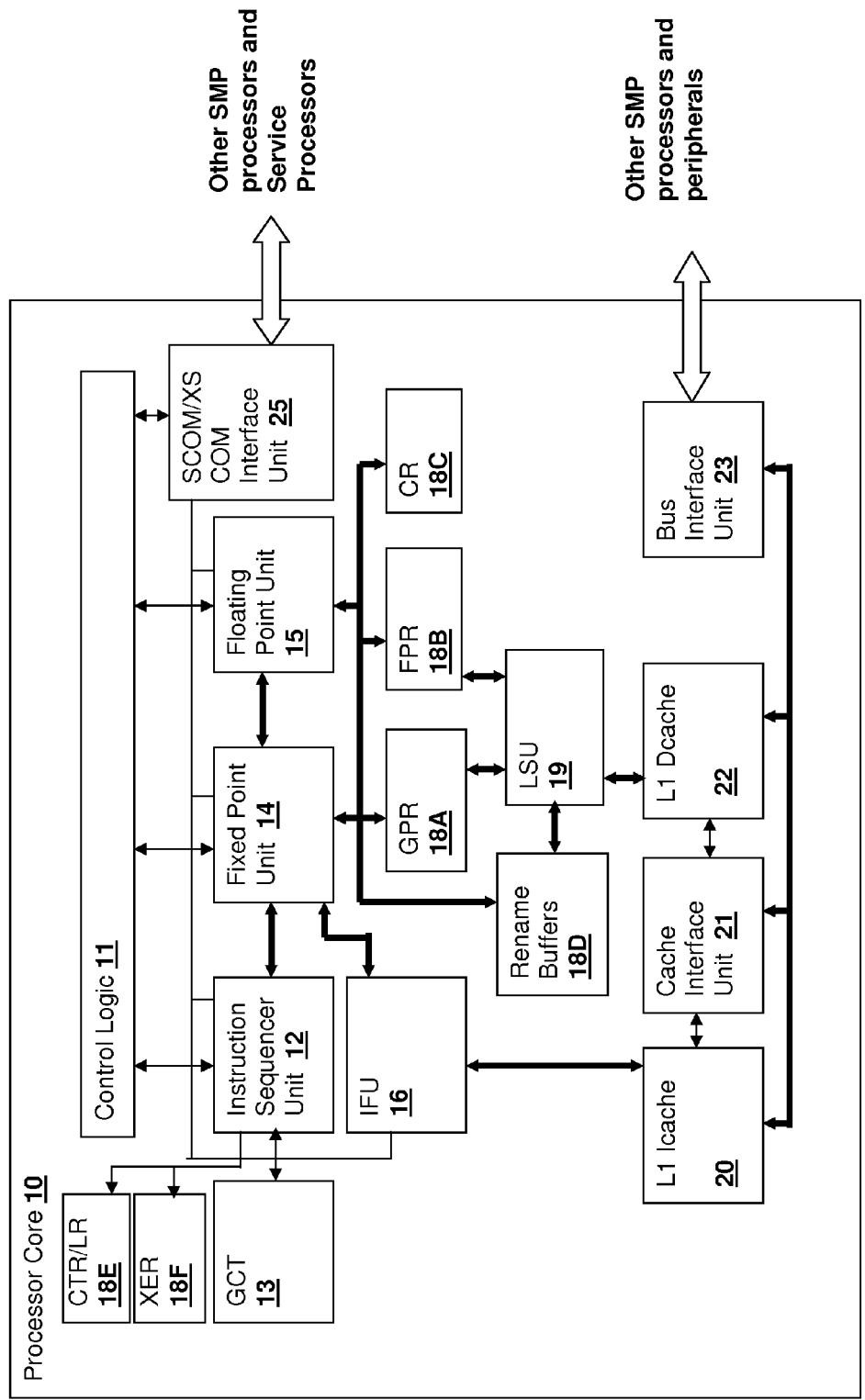
FIG. 2 is a block diagram of a processor core in accordance with an embodiment of the invention.

Referring now to FIG. 2, details of a processor core 10 having features identical to processor cores 10A and 10B is depicted. A bus interface unit 23 connects processor core 10 to other SMT processors and peripherals and connects L1 Dcache 22 for storing data values, L1 Icache 20 for storing program instructions and cache interface unit 21 to external memory, processor and other devices. L1 Icache 20 provides loading of instruction streams in conjunction with instruction fetch unit IFU 16, which prefetches instructions and may include speculative loading and branch prediction capabilities. An instruction sequencer unit (ISU) 12 controls sequencing of instructions issued to various internal units such as a fixed point unit (FXU) 14 for executing general operations and a floating point unit (FPU) 15 for executing floating point operations. Global completion tables (GCT) 13 track the instructions issued by ISU 12 via tags until the particular execution unit targeted by the instruction indicates the instructions have completed execution.

Fixed point unit 14 and floating point unit 15 are coupled to various resources such as general-purpose registers (GPR) 18A, floating point registers (FPR) 18B, condition registers (CR) 18C, rename buffers 18D, count registers/link registers (CTR/LR) 18E and exception registers (XER) 18F. GPR 18A and FPR 18B provide data value storage for data values loaded and stored from L1 Dcache 22 by load store unit (LSU) 19. CR 18C stores conditional branching information and rename buffers 18D (which may comprise several rename units associated with the various internal execution units) provides operand and result storage for the execution units. XER 18F stores branch and fixed point exception information and CTR/LR 18E stores branch link information and count information for program branch execution. GPR 18A, FPR 18B, CR 18C, rename buffers 18D, CTR/LR 18E and XER 18F are resources that include some fixed (architected) registers that store information during execution of a program and must be provided as a fixed set for each executing thread, other non-architected registers within the above resources are free for rename use. Control logic 11 is coupled to various execution units and resources within processor core 10, and is used to provide pervasive control of execution units and resources. An SCOM/XSCOM interface unit 25 provides a connection to external service processors 34A-B.

Figure 3:
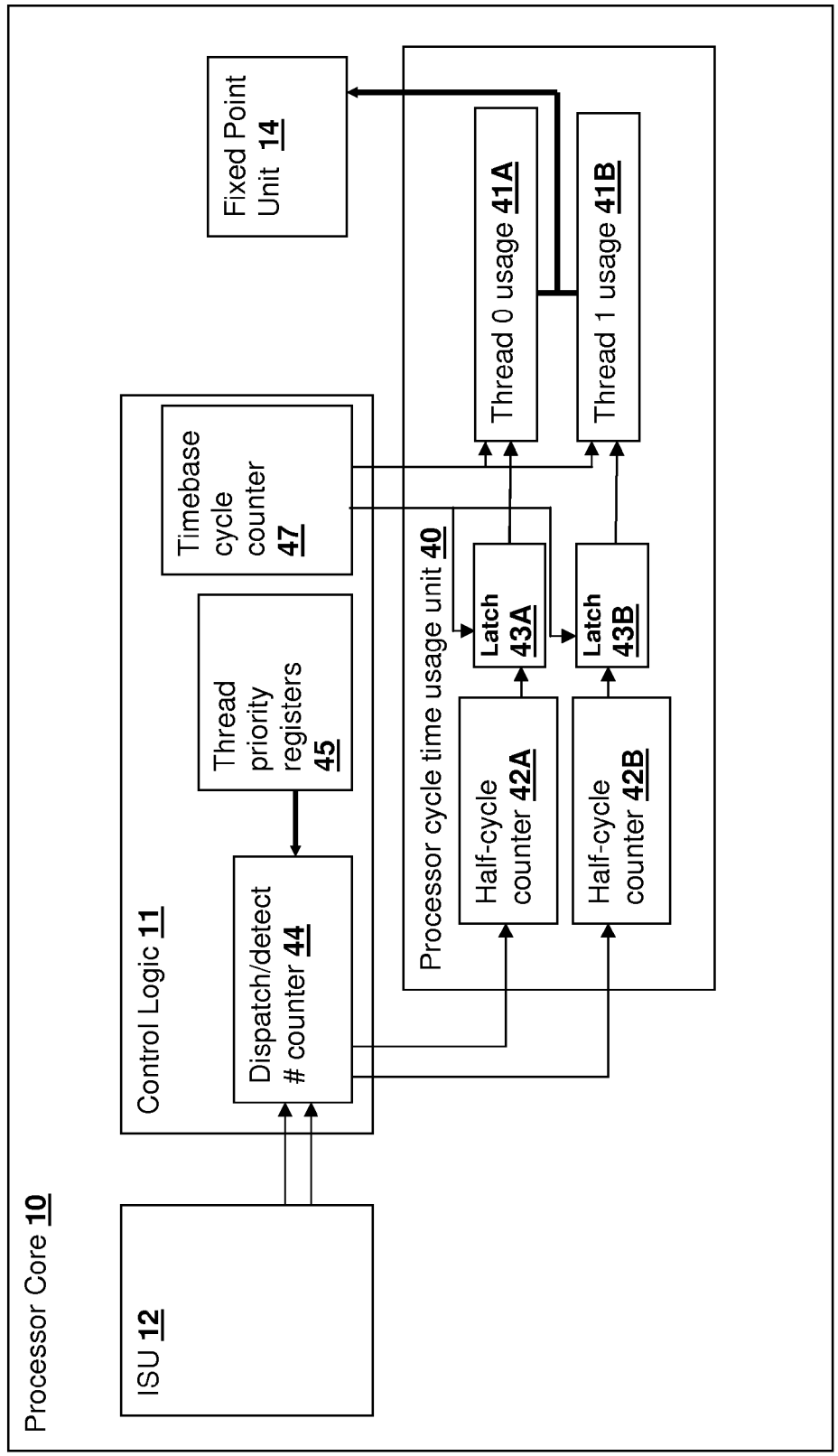
FIG. 3 is a block diagram of details of functional units within processor core 10 of FIG. 2.

Referring now to FIG. 3, details of functional blocks within processor core 10 are depicted. ISU 12 indicates to control logic 11 when instructions are dispatched for particular threads executing with processor core 10. Control logic 11 updates half-cycle counters 42A and 42B selectively depending on whether instructions were dispatched by ISU 12 for a thread associated with a given counter (thread 0 for half-cycle counter 42A and thread 1 for half-cycle counter 42B) in a given cycle as detected by a dispatch detect circuit 44. Outputs of half-cycle counters 42A and 42B are latched by a latches 43A and 43B that are coupled to timebase cycle counter 47. On each $8^{th}$ processor cycle of timebase cycle counter 47, the output of latches 43A and 43B are provided to increment thread usage counters 41A and/or 41B, providing an update of thread usage counters 41A and/or 41B every 8 processor cycles that the timebase cycle counter 47 is active (which will preclude special operations where the timebase is inactive from being charged to active threads). Timebase cycle counter 47 resets latches 43A and 43B after the increment. The above-described action provides counts at the outputs of thread usage counters 41A and/or 41B that are fractions of the timebase counter for the processor and can be used directly to compute the relative thread resource usage in a "usage time" value.

In accordance with alternative embodiments of the invention, other particular cycle states can be used by control logic 11 and ISU 12 (or other execution unit within processor core 10) to trigger an update of half-cycle counter 42A and/or 42B in each cycle, but instruction dispatch is chosen in the exemplary illustration of the invention, as instruction dispatch provides a mechanism for measuring the commencing of each processing activity using processor core 10, instead of the progress or completion of such activities, which are dependent on code efficiency. For example, an inefficiently coded program may generate many incorrect branch predictions and consequent prefetches and flushes, using critical processor resources while generating few completions. Therefore, use of instruction completions rather than instruction dispatches would generate a lower processor time usage measurement for thread executing inefficient code. Therefore, the use of instruction dispatch as the particular trigger event for updating half-cycle counters 41A and 41B provides an estimate of processor resource usage that does not "reward" inefficient code.

While prior accounting models have been able to allocate essentially all of processor core 10 time to a particular thread, due to the lack of simultaneous execution of threads in a given processor, in an SMT processor, "billing" of processor time usage on a per-thread basis must be distributed across the two or more threads that may be simultaneously executing within processor core 10. When ISU 12 is not dispatching instructions for any thread using processor core 10, it is still necessary to account for the use of processor core 10 by all of the threads. The threads may not be commencing new work in the form of dispatched instructions but are still "tying up" processor core 10, or may be active in phases of execution other than instruction dispatch. For example, one thread may be causing long prefetch sequences and another thread may be performing a lengthy floating point operation. Processor resources and execution units are being used actively by both threads, while only a small number of instruction completions would be associated with processing intervals in accordance with the above example. Another particular instruction state that is preferable to completions are instruction fetches, that would provide an indication similar to that of the instruction dispatch, but providing usage counts biased more toward IFU 16 and L1 Icache 20 usage, rather than the usage of execution units including FXU 14, FPU 15 and their associated resources.

Therefore, the exemplary embodiment described herein provides a mechanism for accounting for all processor core 10 cycles based on an estimate of execution unit and resource usage, even when no dispatch occurs in a given cycle (or in alternative embodiments, other particular cycle states or resource usages detected by control logic 11). In cycles where no instruction dispatch occurs for any thread, the cycle is accounted an equal division of the cycle value for each thread executing within processor core 10 (including idle threads that have not been unloaded from processor core 10 and are still tying up processor resources). But, in an alternative embodiment or selectable behavior of control logic 11, control logic 11 may remember the last dispatch state and may use that to update half-cycle counter 42A and/or 42B instead. Another alternative is for control logic 11 to use the relative thread priorities set in processor core 10 to fractionally divide the clock cycle value used to updated half-cycle counter 42A and/or 42B in order to properly allocate a cycle in which no dispatch occurs for any thread.

Similarly, when instructions are dispatched in a given cycle for more than one thread, the cycle is accounted an equal division of the cycle value for each thread for which instructions are dispatched. Or again, control logic 11 may use the relative thread priorities set in processor core 10 to fractionally divide the clock cycle value used to updated half-cycle counter 42A and/or 42B in order to properly allocate a cycle in which dispatches occur for all threads.

Therefore, in the equal division methodology (and not the priority or prior cycle scheme listed as alternatives above), in a processor core that supports the execution of one or two threads, a one-half value is accounted to each thread for cycles in which no dispatch occurs or in cycles in which an instruction dispatch occurs for each thread. In cycles where an instruction dispatch occurs for only one thread, the thread for which instruction dispatch occurs is billed for the entire cycle. Control logic 11 detects one of four potential states: neither thread dispatching, thread 0 dispatching, thread 1 dispatching, or both threads dispatching, and updates thread 0 half-cycle counter 42A and thread 0 half-cycle counter 42B in conformity with the above-described cycle billing distribution.

Since the lowest distribution value described above is for an allocation of one-half cycle increments, half-cycle counters 42A and 42B are updated by an increment (or decrement) of 1 for the half-cycle or 2 for the full cycle allocation. In practice, each of thread usage counters 41A and 41B are updated at one eighth of the possible instruction dispatch rate for chip area, power and timing reasons (or due to the rate of timebase cycle counter 47 which is chosen as ⅛ of the processor cycle time for the same reasons), so the four-bit half-cycle counters 42A and 42B that do not form part of the "architected" thread usage counters provide an effective 8 cycle usage count per overflow (since a value of two will be allocated to the total increment of half-cycle counters 42A and 42B). Half-cycle counters 42A and 42B overflow into the portion of thread usage counters 41A and 41B that are read by fixed point unit 14 when an accounting routine (program) retrieves the processor cycle time usage information. Half-cycle counters 42A and 42B are implemented as adders that add two sub-counts for a full cycle allocation or one-sub count for a half cycle allocation.

In an alternative embodiment of the present invention, processor cycle time usage unit 40 uses an addition to increment (or subtraction to decrement) thread usage counters 41A and 41B. The added value is determined by dispatch detect circuit 44 detecting that multiple dispatches are being made for a given thread, and the associated sub-counter is incremented by (has added to it) a value proportional to the ratio of the number of instructions dispatched for the thread to the total number of instructions dispatched for all threads for the cycle. For example, when processor core 10 is executing two threads and in a given cycle 3 instructions are dispatched for a first thread and one instruction is dispatched for the second thread, a value of ¾ is allocated to the thread usage counter for the first thread and ¼ is allocated to the thread usage counter for the second thread. If no dispatches are made in a given cycle, the cycle is still allocated evenly between the threads.

Figure 4:
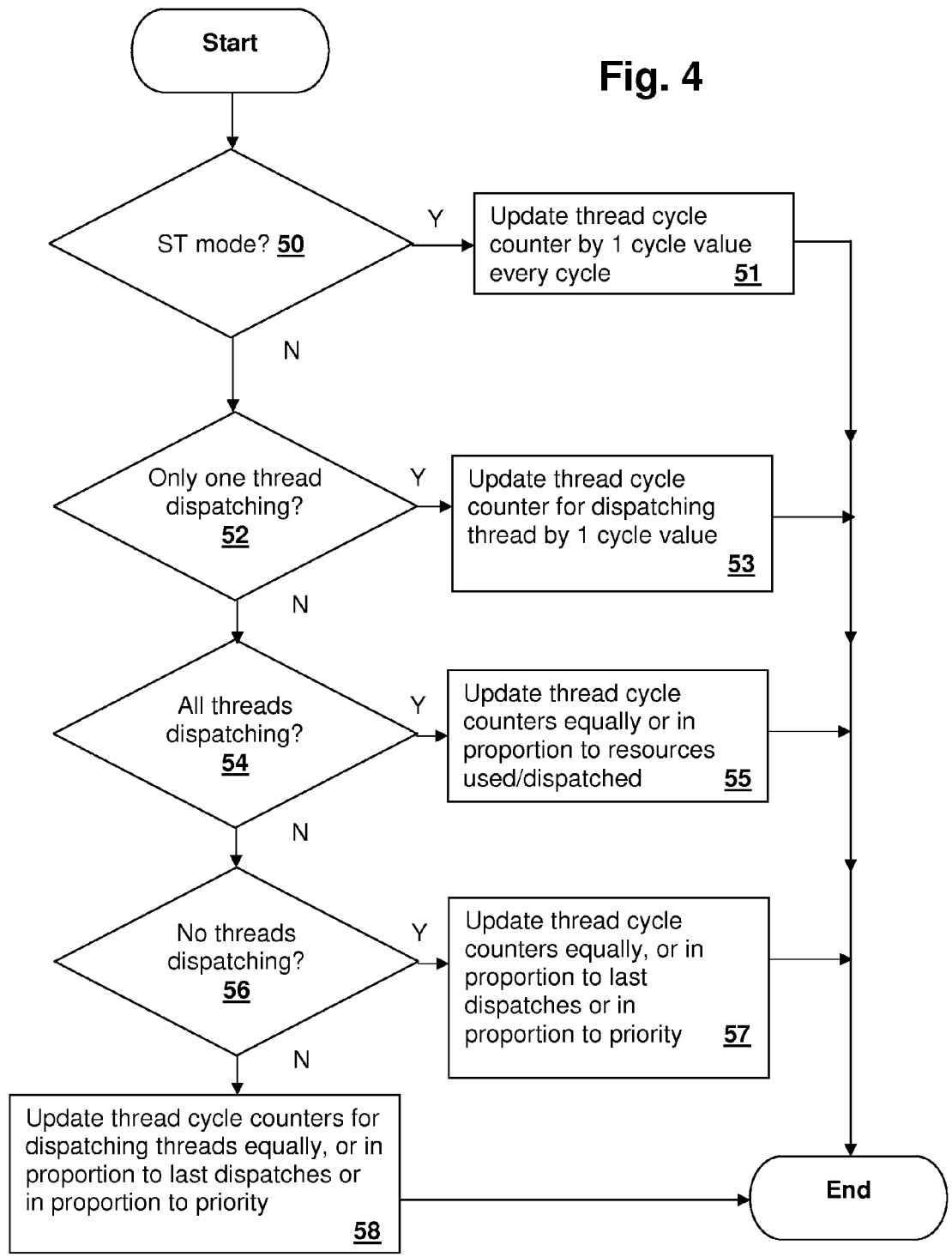
FIG. 4 is a flowchart depicting a method in accordance with an embodiment of the present invention.

Referring now to FIG. 4, a method in accordance with an embodiment of the present invention is depicted in a flowchart. The method depicted is for accounting within an SMT processor having an SMT and an ST mode and is capable of simultaneously executing multiple threads in SMT mode. If the processor is in ST mode (decision 50) the thread cycle counter for the executing thread is updated by 1 cycle value every cycle (step 51). If the processor is in SMT mode (decision 50) if only one thread is dispatching (decision 52), the associated thread cycle counter is updated by 1 cycle value (step 53). If all threads are dispatching (decision 54), the thread cycle counters for all threads are updated equally according to a fraction of a cycle determined by the number of threads or according to the number of dispatches issued (or resources used) for each thread (step 55). If no threads are dispatching (decision 56), the thread cycle counters can be updated equally, or in proportion to the last dispatch sampling, or in proportion to their priority (step 57). Finally if no threads are dispatching, the thread cycle counters can likewise be updated equally, or in proportion to the last dispatch sampling, or in proportion to their priority (step 58)

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of accounting for processor time usage in a processor core having a single-threaded mode of operation and a multi-threaded mode of operation, the method comprising:
   determining whether or not the processor core is in the single-threaded mode;
   at periodic intervals, determining increments to be applied to resource usage counter circuits within the processor core according to amounts of usage of internal resources of the processor core by a plurality of threads executing within the processor core, each of the threads corresponding to one of the resource usage counter circuits, wherein, in response to determining that the processor core is in the single-threaded mode, the increments are determined such that each processor cycle is attributed to a single thread executing within the processor core;
   at the end of the periodic interval, incrementing the resource usage counter circuits by the increments determined by the determining, wherein the counter circuits are incremented by different values according to differences in the amounts of usage of the internal resources of the processor core by their corresponding threads;
   apportioning the processor time usage over a timebase cycle to respective threads of the plurality of threads in proportion to values contained in the resource usage counter circuits at the ends of the periodic intervals, wherein threads of the plurality of threads that use more of the resources are accounted a higher amount of the processor time usage.

2. The method of claim 1, wherein the periodic interval is each clock cycle of the processor core, wherein the method further comprises determining whether or not each thread is in a particular cycle state during a given clock cycle, and wherein the determining increments determines the increments in conformity with a result of detecting whether or not each thread is in a particular cycle state.

3. The method of claim 2, wherein the determining increments further determines values of the increments from a number of resources for each thread that is detected to be in the particular cycle state.

4. The method of claim 2, wherein the particular cycle state is a state indicating an instruction dispatch for a thread.

5. The method of claim 2, wherein the particular cycle state is a state indicating an instruction completion for a thread.

6. The method of claim 2, wherein in response to the detecting having detected that one or more of the plurality of threads is in the particular cycle state, the determining increments assigns equal increments to be applied to the resource usage counter circuits corresponding to the one or more threads.

7. A processor core supporting concurrent execution of a plurality of threads, the processor core comprising:
   a plurality of internal resources used by the plurality of threads and integrated within the processor core;
   an instruction control unit coupled to the plurality of internal resources, wherein the instruction control unit controls a number of the internal resources used by the processor at periodic intervals;
   a plurality of resource usage counter circuits integrated within the processor core, each of the resource usage counter circuits corresponding to a particular one of the plurality of threads;
   a timebase counter for generating a processor usage measurement cycle timebase; and
   a logic circuit coupled to the instruction control unit, the timebase counter, and the resource usage counter circuits, wherein the logic circuit updates each of the resource usage counter circuits according to different increments determined from an amount of usage of internal processor core resources by the corresponding threads, wherein relative processor time usage among the plurality of threads over a cycle of the timebase counter is represented in values contained in the resource usage counter circuits, wherein threads of the plurality of threads that use more of the plurality of internal resources are accounted a higher amount of the processor time usage, wherein the processor core has a single-threaded mode of operation and a multi-threaded mode of operation, and wherein the logic circuit determines whether or not the processor core is in the single-threaded mode, and in response to determining that the processor core is in the single-threaded mode, increments the resource usage counter corresponding to a single thread executin within the processor core at each cycle.

8. The processor core of claim 7, wherein the periodic intervals are individual clock cycles of the processor core, and wherein the logic circuit determines whether or not each thread is in a particular cycle state.

9. The processor core of claim 8, wherein the control logic further determines a number of internal resources used by each thread that is determined to be in the particular cycle state.

10. The processor core of claim 9, wherein the control logic fractionally increments each of the resource usage counter circuits in conformity with the determined number of internal resources used by their corresponding threads.

11. The processor core of claim 8, wherein the particular cycle state is a state indicating an instruction dispatch for a thread.

12. The processor core of claim 8, wherein the control logic, in response to determining that one or more of the plurality of threads are in the particular cycle state, equally increments the resource usage counter circuits that correspond to the one or more threads.

13. A processor core supporting concurrent execution of a plurality of threads, the processor core comprising:
   a plurality of internal resources used by the plurality of threads and integrated within the processor core;
   an instruction control unit coupled to the plurality of internal resources, wherein the instruction control unit controls a number of the internal resources used by the processor at periodic intervals;
   a plurality of resource usage counter circuits integrated within the processor core, each of the resource usage counter circuits corresponding to a particular one of the plurality of threads;
   a timebase counter for generating a processor usage measurement cycle timebase; and
   a logic circuit coupled to the instruction control unit, the timebase counter, and the resource usage counter circuits, wherein the logic circuit updates each of the resource usage counter circuits according to different increments determined from an amount of usage of internal processor core resources by the corresponding threads, wherein relative processor time usage among the plurality of threads over a cycle of the timebase counter is represented in values contained in the resource usage counter circuits, wherein threads of the plurality of threads that use more of the plurality of internal resources are accounted a higher amount of the processor time usage, wherein the logic circuit fractionally increments each of the resource usage counter circuits in conformity with the determined number of internal resources used by their corresponding threads.

* * * * *